US009749420B2

(12) United States Patent
Malik et al.

(10) Patent No.: US 9,749,420 B2
(45) Date of Patent: Aug. 29, 2017

(54) CONTROLLING AN IOT DEVICE USING A REMOTE CONTROL DEVICE VIA AN INFRASTRUCTURE DEVICE

(71) Applicant: QUALCOMM Incorporated, San Diego, CA (US)

(72) Inventors: Rahul Malik, San Diego, CA (US); Peerapol Tinnakornsrisuphap, San Diego, CA (US); Menucher Menuchehry, Carlsbad, CA (US); Qi Xue, San Diego, CA (US); Bibhu Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/049,301

(22) Filed: Feb. 22, 2016

(65) Prior Publication Data
US 2016/0381143 A1 Dec. 29, 2016

Related U.S. Application Data

(60) Provisional application No. 62/183,827, filed on Jun. 24, 2015.

(51) Int. Cl.
*H04W 52/02* (2009.01)
*H04L 29/08* (2006.01)
(Continued)

(52) U.S. Cl.
CPC .......... *H04L 67/125* (2013.01); *H04L 12/189* (2013.01); *H04W 4/005* (2013.01); *H04W 4/06* (2013.01); *H04W 84/12* (2013.01)

(58) Field of Classification Search
CPC ....... H04W 4/005; H04W 4/06; H04W 8/005; H04W 52/0025; H04W 52/0254;
(Continued)

(56) References Cited

U.S. PATENT DOCUMENTS 7,843,865 B2  11/2010  Kumar
8,054,854 B2  11/2011  Poslinski
(Continued)

OTHER PUBLICATIONS

Ozcelik I.M., "Energy Efficient IP-Connectivity with IEEE 802.11 for Home M2M Networks," Thesis, Submitted to Department of Computer Engineering and Graduate School of Engineering and Science of Bilkent University, Jul. 2014, 58 Pages.
(Continued)

*Primary Examiner* — Thanh Le
(74) *Attorney, Agent, or Firm* — The Marbury Law Group/Qualcomm

(57) ABSTRACT

Described herein are implementations for using a remote control device to control a target device on a network. An exemplary remote control device may generate a data packet comprising a command for controlling the target device and a network address associated with the target device. The remote control device may establish a connection to an infrastructure device on the network, and transmit the data packet to the infrastructure device. The infrastructure device may multicast the data packet to a plurality of IoT devices on the network. An IoT device, of the plurality of IoT devices, may execute the command based on determining, using the network address, that the IoT device is the target device.

19 Claims, 3 Drawing Sheets

(51) Int. Cl.
*H04W 4/00* (2009.01)
*H04W 4/06* (2009.01)
*H04L 12/18* (2006.01)
*H04W 84/12* (2009.01)

(58) Field of Classification Search
CPC .. H04W 52/0274; H04L 67/16; H04L 67/125; G08C 17/02; G08C 2201/20; G08C 2201/50; G08C 2201/40; G08C 2201/93; G08C 2201/12; G05B 13/02
See application file for complete search history.

(56) References Cited

U.S. PATENT DOCUMENTS

| | | | |
|---|---|---|---|
| 8,411,590 B2 | 4/2013 | Wang | |
| 2003/0217136 A1 | 11/2003 | Cho et al. | |
| 2008/0075096 A1* | 3/2008 | Wagner | H04L 63/029 370/401 |
| 2013/0298199 A1* | 11/2013 | Lord | H04W 4/02 726/4 |
| 2014/0003373 A1 | 1/2014 | Hakola et al. | |
| 2014/0214958 A1* | 7/2014 | Cheshire | H04L 67/16 709/204 |
| 2014/0244001 A1 | 8/2014 | Glickfield et al. | |
| 2014/0359131 A1 | 12/2014 | Seed et al. | |
| 2015/0036573 A1 | 2/2015 | Malik et al. | |
| 2015/0071052 A1 | 3/2015 | Hershberg et al. | |
| 2015/0135214 A1 | 5/2015 | Reisman | |
| 2015/0358777 A1 | 12/2015 | Gupta | |
| 2016/0006641 A1 | 1/2016 | Wiggs et al. | |
| 2016/0087933 A1* | 3/2016 | Johnson | H04W 4/001 709/245 |
| 2016/0209997 A1* | 7/2016 | Lee | H04L 67/12 |
| 2016/0381144 A1 | 12/2016 | Malik | |

OTHER PUBLICATIONS

International Search Report and Written Opinion—PCT/US2016/033748—ISA/EPO—Sep. 7, 2016.

Pandey M., et al., "Scalable Multicast Routing for Ad Hoc Networks", Mobile Ad Hoc and Sensor Systems, 2008. 5th IEEE International conference on, IEEE, Piscataway, NJ, USA, Sep. 29, 2008 (Sep. 29, 2008), XP031354836, pp. 559-564, ISBN: 978-1-4244-257 4-7.

Shin Y., et al., "Smartphone as a Remote Control Proxy in Automotive Navigation System", Contemporary Engineering Sciences, Jan. 1, 2014 (Jan. 1, 2014), XP055297289, pp. 683-689, DOI : 10.12988/ces. 2014.4675.

Tanigawa Y., et al., "Transparent Uni cast Translation to Improve Quality of Multicast over Wireless LAN," Consumer Communications and Networking Conference (CCNC), 2010 7th IEEE, IEEE, Piscataway, NJ, USA, Jan. 9, 2010 (Jan. 9, 2010), pp. 1-5, XP031642735, ISBN: 918-1-4244-5175-3 section III.

International Search Report and Written Opinion—PCT/US2016/033748—ISA/EPO—Jul. 9, 2016.

Tanigawa Y., et al., "Transparent Unicast Translation to Improve Quality of Multicast over Wireless LAN", 7th IEEE Consumer Communications and Networking Conference (CCNC), Piscataway, NJ, USA, Jan. 9, 2010 (Jan. 9, 2010), pp. 1-5, XP031642735, ISBN: 978-1-4244-5175-3.

* cited by examiner

CONTROLLING AN IOT DEVICE USING A REMOTE CONTROL DEVICE VIA AN INFRASTRUCTURE DEVICE

CROSS-REFERENCE TO RELATED APPLICATIONS

The present application claims priority to U.S. Provisional Application No. 62/183,827, filed Jun. 24, 2015, titled "Remote Control Device for Controlling Network Devices," the entirety of which is incorporated herein by reference.

TECHNICAL FIELD

The present application generally relates to a remote control device for controlling IoT (Internet of Things) devices.

BACKGROUND

A remote control device may be used to control one or more IoT devices on a network. There is a need for a low-power and low-latency remote control device that provides high level of reliability for controlling one or more existing IoT devices associated with various manufacturers.

SUMMARY

Described herein are various implementations of using a remote control device to control a target device on a network. The remote control device may generate a data packet comprising a command for controlling the target device and a network address associated with the target device. The remote control device may establish a connection to an infrastructure device on the network, and may transmit the data packet to the infrastructure device. The infrastructure device may multicast the data packet to a plurality of IoT devices on the network. An IoT device, of the plurality of IoT devices, may execute the command based on determining, using the network address, that the IoT device is the target device. In some implementations, a non-transitory computer readable medium may be provided for performing the methods of the remote control device.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Although similar reference numbers may be used to refer to similar elements for convenience, it may be appreciated that each of the various example implementations may be considered distinct variations.

DETAILED DESCRIPTION

A remote control device may be used to control operations of an IoT device. An IoT device may be any device that is capable of communicating on a network. Communicating on a network may include transmitting information to a device on the network, or receiving information from a device on the network. Examples of IoT devices include a fan, a light, a set-top-box (STB), a media player, a television, a laptop computing device, a microwave, a speaker, an air-conditioner, etc. In some implementations, the IoT device may be connected to a power supply that provides energy for operating the IoT device. The power supply may be an alternating current (AC) power supply or a direct current (DC) power supply. In some implementations, the IoT device may comprise a Universal Plug and Play (UPnP) stack. IoT devices may have wired interfaces (e.g., Ethernet interfaces or powerline communication (PLC) interfaces), wireless interfaces (e.g., Wi-Fi interfaces), or hybrid interfaces (i.e., including both wired and wireless interfaces) and may be associated with any protocol and operating frequency.

In some implementations, the remote control device may be a battery-operated device with a limited communication range and/or a limited amount of available power. The remote control device may be a wireless local area network (WLAN)-capable remote control device that utilizes WLAN communication protocols to communicate with and control operation of an IoT device. An exemplary remote control device may operate on a frequency of approximately 2.4 GHz. Using WLAN communication protocols for remote control device communication may allow for high data rate applications including gesture interaction, touchpad interaction, voice interaction, wireless headset functionality via the remote control device, display via the remote control device, etc. Using WLAN communication protocols for remote control device communication may be cost effective when the controlled IoT device has existing WLAN capabilities for Internet connectivity. In such an environment, using a WLAN-capable remote control device may preclude the need for additional transceiver and processing components to enable remote control device communication at the controlled IoT device. For example, using a WLAN-capable remote control device may preclude the need for infrared (IR) detection and processing components at the controlled IoT device. The remote control device may be configured or programmed by a configuring device (e.g., a mobile computing device such as a mobile phone). The configuring device may have been previously authenticated to the network.

The remote control device may be a universal remote control device to operate multiple types of IoT devices associated with multiple manufacturers. These and other details of the example implementations, which provide one or more technical solutions to the aforementioned technical problems, are described in more detail below.

Figure 1:
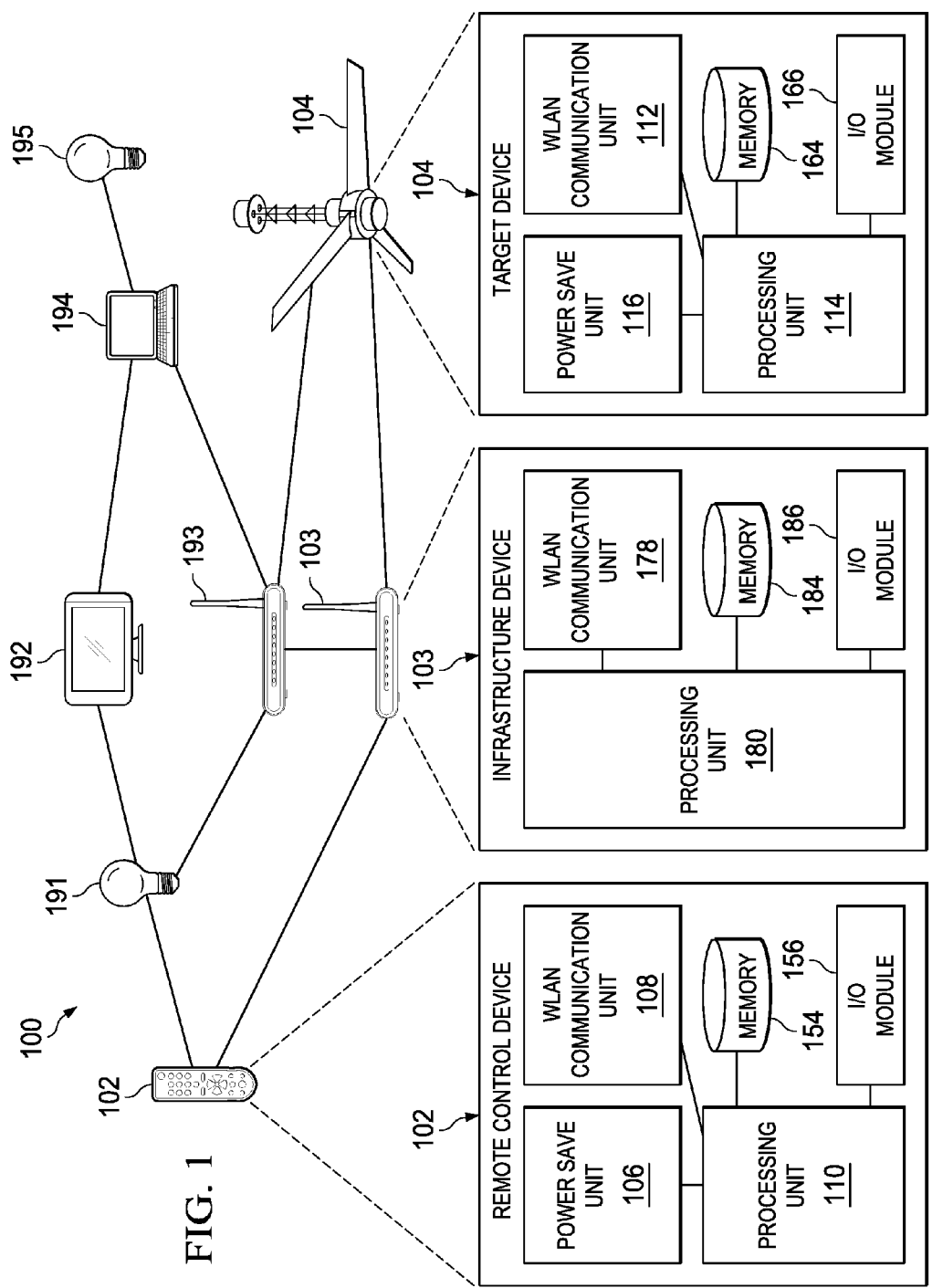
FIG. 1 shows a system environment for a remote control device on a network, in accordance with some implementations of this disclosure.

FIG. 1 shows an exemplary system environment for a WLAN-capable remote control device in a network 100. The network 100 includes a remote control device 102, a target device 104 (e.g., an IoT device such as a fan), an infrastructure device 103, and other IoT devices such as a light bulb 191, a television 192, a second infrastructure device 193, a laptop 194, and a second light bulb 195. The other IoT devices are not limited to those shown in FIG. 1. The IoT devices may be connected directly to other IoT devices or indirectly via one or more intermediate IoT devices. In some implementations, the IoT devices may provide software access point (soft AP) functionality. This means that the IoT devices may provide the same function as the infrastructure device 103, which, as described below, routes data from a source IoT device to a destination IoT device.

The remote control device 102 may include a power save unit 106, a WLAN communication unit 108, a processing unit 110, a memory 154, and an I/O module 156. The infrastructure device 103 may include a WLAN communication unit 178, a processing unit 180, a memory 184, and an I/O module 186. The target device 104 may include a WLAN communication unit 112, a processing unit 114, a power save unit 116, a memory 164, and an I/O module 166. The other IoT devices may comprise the similar features, elements, components, or modules comprised in either the target device 104 or the infrastructure device 103.

Any WLAN communication unit described in this disclosure may transmit or receive wireless signals associated with one or more frequencies. Exemplary wireless signals or protocols include Wi-Fi (IEEE 802.11), WiMAX (IEEE 802.16), Bluetooth (IEEE 802.15.1), ZigBee (IEEE 802.15.4), radio frequency (RF), infrared (IR), etc. Exemplary frequencies that may be handled by the WLAN communication unit include 868 MHz (ZigBee), 900 MHz (Wi-Fi or ZigBee), 2.3 GHz (WiMAX), 2.4 GHz (Wi-Fi, Bluetooth, or ZigBee), 2.5 GHz (WiMAX), 3.5 GHz (Wi-Fi or WiMAX), 4.9 GHz (Wi-Fi), 5 GHz (Wi-Fi), 5.9 GHz (Wi-Fi), 60 GHz (Wi-Fi), 300 GHz-430 THz (IR), 3 kHz to 300 GHz (RF), etc. In addition to WLAN communication units, any device described in this disclosure may include a wired communication unit that is configured to receive and transmit wired signals associated with any protocol (e.g., Ethernet, PLC, etc.). This disclosure is not limited to any particular wireless or wired signals.

In some implementations, the remote control device 102, the target device 104, and the infrastructure device 103 may use WLAN communication protocols to operate in an ad-hoc mode. In the ad-hoc mode, the WLAN communication units 108, 112, and 178 may exchange data packets to establish direct WLAN communication links between each other. For example, the WLAN communication units 108, 112, and 178 may implement any suitable communication protocol, such as Wi-Fi (e.g., Wi-Fi Direct) communication protocols, tunneled direct link setup (TDLS) communication protocols, peer-to-peer communication protocols, wireless mesh communication protocols, etc. for operation in the ad-hoc mode.

In other implementations, the remote control device 102 and the target device 104 may use WLAN communication protocols to operate in an infrastructure mode. In the infrastructure mode, the remote control device 102 and the target device 104 may communicate via an infrastructure device 103 or another intermediate IoT device. For example, the WLAN communication units 108 and 112 may exchange data packets via the intermediate IoT device to establish a WLAN communication link between the remote control device 102 and the target device 104. The WLAN communication unit 178 of the infrastructure device 103 may use WLAN communication protocols to establish direct or indirect WLAN connections with the WLAN communication unit 108 of the remote control device 102, the WLAN communication unit 112 of the target device 104, or WLAN communication units of any of the other IoT devices shown in FIG. 1. In some implementations, the WLAN communication units 108, 112, and 178 may include one or more radio transceivers, analog front end (AFE) units, antennas, processing units, memory, other logic, and/or other components to implement the communication protocols and related functionality.

In some implementations, the infrastructure device 103 may use a combination of hardware and software to route data from a source IoT device to a destination IoT device. The infrastructure device 103 may be an access point, a range extender that extends the range of an access point, a wired or wireless router, a network gateway, or any suitable IoT device.

In some implementations, the target device 104 may be a WLAN-enabled device (e.g., a WLAN-enabled fan). The remote control device 102 may use WLAN communication protocols to control the operation of the target device 104 based on user input detected by the processing unit 110. In other implementations, the target device 104 may be a cable television set-top box, a laptop computer, a tablet computer, a gaming console, a media player, a smart appliance, a light bulb, an air-conditioner, a microwave, an infrastructure device such as an access point or a range extender, or another suitable IoT device that may be controlled by the remote control device 102.

In some implementations, the remote control device 102 may be a dedicated controller device. In other implementations, the remote control device 102 may be implemented in an application on an electronic IoT device, such as a mobile device (e.g., smartphone, tablet, etc.) or a wearable device (e.g., a smart watch, a wristband, headgear, glasses, etc.). The electronic IoT device may execute the application and allow the user to provide a remote control device input via a user interface.

In some implementations, the remote control device 102 may wirelessly establish a direct communication link with the target device 104 (e.g., using TDLS communication protocols, Wi-Fi Direct communication protocols, etc.). However, in other implementations, the remote control device 102 may wirelessly connect to the target device 104 via an intermediate IoT device such as the infrastructure device 103 or other IoT devices (e.g., the light bulb 191, the television 192, the second infrastructure device 193, the laptop 194, etc.). In such implementations, the remote control device 102 may control the target device 104 via the intermediate IoT device. The remote control device 102 may transmit data packets (e.g., user input) to the target device 104 via the intermediate IoT device, and may receive data packets from the target device 104 via the intermediate IoT device. In some implementations, the remote control device 102 and the intermediate IoT device may exchange communications using one communication protocol; while the intermediate IoT device and the target device 104 may exchange communications using another communication protocol. For example, the remote control device 102 and the intermediate IoT device may exchange communications using WLAN communication protocols; while the intermediate IoT device and the target device 104 may exchange communications using Ethernet communication protocols. In some implementations, the intermediate IoT device may execute one or more operations of the remote control device 102 and/or the target device 104. In some implementations, the remote control device 102 may wirelessly establish a direct communication link with both the target device 104 and the intermediate IoT device.

In some implementations, the remote control device 102 may initiate communications exchanged between the remote control device 102 and the target device 104. For example, the remote control device 102 may initiate communications with the target device 104 in response to the processing unit 110 detecting a user input. For example, the processing unit 110 may receive an indication if the user presses a physical button on the remote control device 102. As another example, the processing unit 110 may receive an indication from a microphone or other audio sensor if the user provides a voice input. As another example, the processing unit 110 may receive an indication from a gyroscope, accelerometer, another suitable motion sensor (e.g., detects motion of the remote control device 102), a camera, another suitable machine vision detector if the user provides a gesture input, a proximity sensor (detects proximity of a user's hand or other body part to the remote control device 102), etc. As another example, the processing unit 110 may receive an indication from a pressure sensor or another suitable sensor integrated with a remote control device touchscreen if the user activates a virtual button on the remote control device 102. In other implementations, the processing unit 110 may detect other suitable types of user input, such as activation of another suitable trigger mechanism, a mouse click, a stylus-based selection, motion of a wearable input-providing device, etc. Furthermore, in some implementations, the I/O module 156 may include an audio sensor, motion sensors, touchscreen sensors, proximity sensors, etc. for detecting various types of user input.

For power conservation at the remote control device 102, the power save unit 106 may maintain the remote control device 102 in a sleep operating state until the processing unit 110 receives user input. In some implementations, communication components of the remote control device 102 (e.g., the WLAN communication unit 108) may be disabled in the sleep operating state. Accordingly, the remote control device 102 may not transmit or receive communications in the sleep operating state. In some implementations, the processing components and the communication components of the remote control device 102 may be enabled in an active operating state. Accordingly, the remote control device 102 may transmit or receive communications in the active operating state. When the processing unit 110 of the remote control device 102 receives the user input, the remote control device 102 may transition from the sleep operating state to the active operating state.

For power conservation at the target device 104, the power save unit 116 may cause the target device 104 to periodically transition between the sleep operating state and the active operating state. In some implementations, communication components of the target device 104 (e.g., the WLAN communication unit 112) may be disabled in the sleep operating state. Accordingly, the target device 104 may not transmit or receive communications in the sleep operating state. In some implementations, the processing components and the communication components of the target device 104 may be enabled in the active operating state. Accordingly, the target device 104 may transmit or receive communications in the active operating state. In some implementations, the power save unit 116 at the target device 104 is disabled, and the target device 104 may always be in the active operating state.

The time interval for which the target device 104 and the remote control device 102 are configured in the sleep operating state ("sleep interval") and the time interval for which the target device 104 and the remote control device 102 are configured in the active operating state ("active interval") may be determined based on various factors. For example, the sleep interval and the active interval may be determined based, at least in part, on power consumption specifications of the target device 104 and/or the remote control device 102 and a maximum allowable latency between a user providing the user input (e.g., pressing a button on the remote control device 102, detecting motion, proximity, or audio input on the remote control device 102) and the target device 104 receiving the user input (and performing an operation based on the defined user input).

The processing units 110, 114, and 180 may control any of the other modules and/or functions performed by the various modules in the remote control device 102, the target device 104, and the infrastructure device 103, respectively. Any actions described as being taken by a processing unit may be taken by the processing unit alone or by the processing unit in conjunction with one or more additional modules. Additionally, while only one processing unit may be shown in certain devices, multiple processing units may be present. Thus, while instructions may be discussed as being executed by a processing unit, the instructions may be executed simultaneously, serially, or otherwise by one or multiple processing units. A processing unit may be implemented as one or more central processing units (CPUs) and may be a hardware device capable of executing computer instructions. The processing unit may execute instructions, codes, computer programs, or scripts. The instructions, codes, computer programs, or scripts may be received from memory 154, 164, and 184, from I/O modules 156, 166, and 186, or from WLAN communication units 108, 112, and 178 comprised in the remote control device 102, the target device 104, and the infrastructure device 103, respectively.

The I/O modules 156, 166, and 186 may include modems, modem banks, Ethernet interfaces, universal serial bus (USB) interface interfaces, serial interfaces, token ring interfaces, fiber distributed data interface (FDDI) interfaces, wireless local area network (WLAN) interfaces, radio transceiver interfaces such as code division multiple access (CDMA) interfaces, global system for mobile communications (GSM) radio transceiver interfaces, universal mobile telecommunications system (UMTS) radio transceiver interfaces, long term evolution (LTE) radio transceiver interfaces, worldwide interoperability for microwave access (WiMAX) interfaces, and/or other interfaces for connecting to networks. I/O modules 156, 186, and 166 may also include liquid crystal displays (LCDs), touch screen displays, keyboards, keypads, switches, dials, mice, track balls, voice recognizers, card readers, paper tape readers, printers, video monitors, or other well-known input/output devices.

Memory 154, 164, and 184 may include random access memory (RAM), read only memory (ROM), or various forms of secondary storage. RAM may be used to store volatile data and/or to store instructions that may be executed by a processing unit. For example, the data stored may be a command, a current operating state of a device, an intended operating state of a device, etc. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution.

A network in this disclosure may include routers, hubs, switches, firewalls, content switches, gateways, call controllers, and/or any other suitable components in any suitable form or arrangement. Networks may include, in whole or in part, one or more secured and/or encrypted Virtual Private Networks (VPNs) operable to couple one or more network elements together by operating or communicating over elements of a public or external network. A network may be a wired, wireless, or hybrid wired and wireless network.

Figure 2:
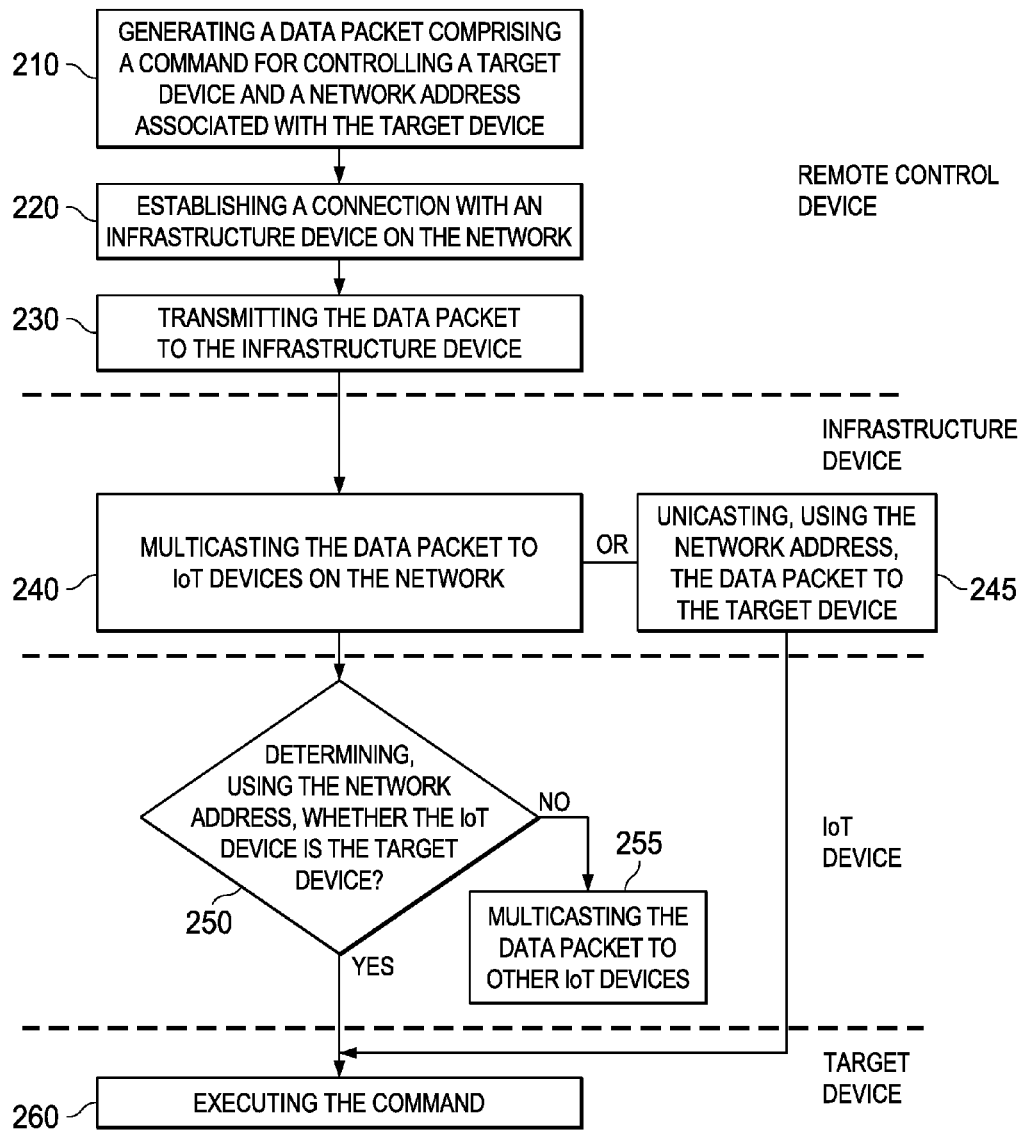
FIG. 2 shows a method for using a remote control device to control a target device on a network, in accordance with some implementations of this disclosure.

FIG. 2 shows a method for using a remote control device 102 to control a target device 104 via a network, in accordance with some implementations of the disclosure. The target device 104 may not be in communicable range of the remote control device 102. The various blocks of FIG. 2 may be presented in any order, and is not limited to the order described herein. For example, block 220 may be executed before block 210, even though FIG. 2 indicates that block 220 is executed after block 210.

At block 210, the method comprises generating, by the remote control device 102, a data packet comprising a command for controlling the target device 104 and a network address associated with the target device 104. The data packet may be generated upon receiving user input at the remote control device 102. For example, the user input may be an instruction to turn on the target device 104. The remote control device 102 may generate a data packet comprising a command for turning on the target device 104 and a network address associated with the target device 104. The data packet may additionally comprise state information, including a current known state (e.g., the 'off' state) of the target device 104 and/or an intended state (e.g., the 'on' state) of the target device 104. A network address associated with the target device 104 may be information indicating a location of the target device 104 on the network. In some implementations, the network address may be a media access control (MAC) address or an Internet Protocol (IP) address associated with a single target device. In some implementations, the network address may be a multicast network address (e.g., multicast media access control identification (MAC ID)) associated with a group of target devices. In some implementations, a target device may have multiple interfaces (e.g., Wi-Fi interface, Ethernet interface, etc.) associated with a single network address. In other implementations, each of the network interfaces of a target device may be associated with a separate network address. The command, the network address, and the state information may be stored in the payload portion and/or the header portion of the data packet. In some implementations, the data packet may be an IP multicast data packet. In some implementations, the data packet may be a UPnP data packet. In some implementations, the data packet may be a multicast data packet embedded inside a unicast data packet. In some implementations, the data packet may comprise a public action frame.

At block 220, the method further comprises establishing a connection with an infrastructure device 103 on the network. Establishing a connection between the remote control device 102 and the infrastructure device 103 may comprise associating the remote control device 102 with the infrastructure device 103 on the network. Associating the remote control device 102 with the infrastructure device 103 may comprise transmitting, to the infrastructure device 103, a credential associated with the network. The credential may have been previously programmed into the remote control device 102 during a configuring process executed by a configuring device. The credential may include a security set identifier (SSID), a passphrase, etc. The remote control device 102 may wake up (e.g., change its state from a sleep operating state to an active operating state) and associate with the network upon receiving an input at the remote control device 102, for example, pressing of a button or swiping of a screen on the remote control device 102, detecting a motion of the remote control device 102 (e.g., using a motion sensor in the remote control device 102), detecting a user's hand near the remote control device 102 (e.g., using a proximity sensor in the remote control device 102), etc.

At block 230, the method further comprises transmitting the data packet, comprising the command for the target device 104, from the remote control device 102 to the infrastructure device 103. The data packet may also include a network address. The transmission of the data packet from the remote control device 102 to the target device 104 may be an encrypted transmission because the remote control device 102 is authenticated to the network (e.g., establishes an association with an infrastructure device 103) using a credential associated with the network. Since the transmission is encrypted, an unauthorized user (who does not have access to the credential associated with the network) may not be able to copy, compromise, or otherwise decipher the transmission.

Upon receiving the data packet, the infrastructure device 103 may or may not send an acknowledgment to the remote control device 102 indicating that the infrastructure device 103 has received the data packet. In some implementations, the remote control device 102 may send multiple copies of the data packet to the infrastructure device 103. For example, a first copy may be transmitted on an Ethernet connection, and a second copy may be transmitted on a Wi-Fi connection. A time stamp and sequence number (e.g., a different time stamp and sequence number) may be included in each copy of the data packet transmitted by the remote control device 102. In this manner, if the infrastructure device 103 receives multiple copies of the same data packet, it may recognize and discard the duplicate copies based on the different time stamp and/or sequence number of those copies. In some implementations, the remote control device 102 may enter the sleep operating state after transmitting multiple copies of the same data packet to the infrastructure device 103. The remote control device 102 may re-associate with the infrastructure device 103 upon waking up from the sleep operating state. In some implementations, a timer in the remote control device 102 may be activated for a particular duration upon entering a particular state (e.g., either the active operating state or the sleep operating state). During this particular duration, the remote control device 102 may not change states even if the remote control device 102 receives user input directed to changing the state of the remote control device 102.

At block 240, the method further comprises the infrastructure device 103 multicasting or broadcasting the data packet to IoT devices, associated with different network interfaces, in wired or wireless communication with the infrastructure device 103 on the network. For example, the infrastructure device 103 may unpack a unicast-formatted multicast data packet, recognize that the data packet is a multicast data packet, and then multicast the multicast data packet to IoT devices in wired or wireless communication with the infrastructure device 103. As a further example, the data packet may be multicasted from the infrastructure device 103 to a first IoT device via an Ethernet interface and/or a Wi-Fi interface between the infrastructure device 103 and the first IoT device, and to a second IoT device via an Ethernet interface and/or a Wi-Fi interface between the infrastructure device 103 and the second IoT device. Each IoT device that receives the data packet may also multicast the data packet to other IoT devices in wired or wireless communication with the IoT device if the IoT device determines that it is not the target device 104 based on the network address in the data packet not matching the IoT device's network address. Some IoT devices may be devices that may be controlled by the remote control device 102. Other IoT devices may not be devices that may not be controlled by the remote control device 102. Alternatively, at block 245, the method further comprises unicasting, using the network address in the data packet, the data packet to the target device 104.

In some implementations, an IoT device may need to pre-subscribe with the infrastructure device 103 (or the network) for receiving data packets. This means that the IoT device may need to register with the infrastructure device 103 for receiving data packets and/or receiving certain types of data packets (e.g., IP multicast data packets, public action frames, etc.). In some implementations, if the IoT device does not pre-subscribe with the infrastructure device 103 for receiving a data packet, the IoT device may not be able to extract a network address from the data packet received from the infrastructure device 103.

At block 250, the method further comprises determining, using the network address comprised in the data packet, whether the IoT device, which receives the data packet, is the target device 104. Therefore, if the IoT device determines that its network address matches the network address in the data packet, the IoT device may determine that it is the target device 104 and may execute the command comprised in the data packet. Thus, at block 260, the method further comprises the target device 104 executing the command comprised in the data packet. The execution of a command may cause a change of state from the current state of the target device 104 to the intended state of the target device 104, which may be derived from the state information comprised in the data packet. Alternatively, if the IoT device determines that it is not the target device 104 by determining that the IoT device's network address does not match the network address in the data packet, the IoT device may multicast the data packet to other IoT devices, which may also be referred to as intermediate IoT devices. Therefore, at block 255, the method further comprises multicasting the data packet to other IoT devices. Each IoT device receives the data packet and may determine whether it is the target device 104 by determining whether the IoT device's network address matches the network address in the data packet. If there is a match, the IoT device may execute the command comprised in the data packet.

Figure 3:
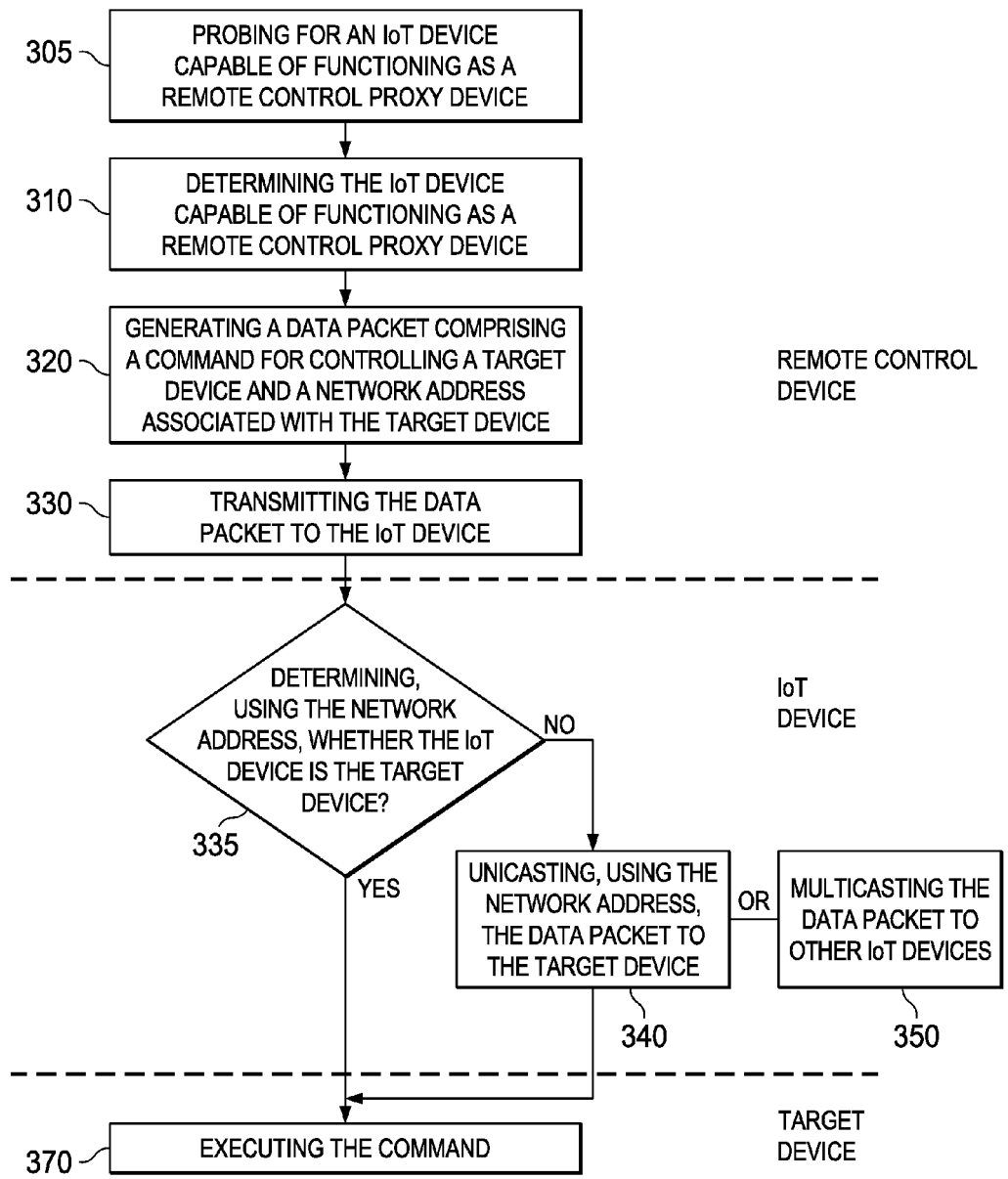
FIG. 3 shows another method for using a remote control device to control a target device on a network, in accordance with some implementations of this disclosure.

FIG. 3 shows another implementation for using a remote control device 102 to control a target device 104 via a network, in accordance with some implementations of the disclosure. The target device 104 may not be in communicable range of the remote control device 102. The various blocks of FIG. 3 may be presented in any order, and is not limited to the order described herein. For example, block 320 may be executed before block 310, even though FIG. 3 indicates that block 320 is executed after block 310. Any of the features described with respect to the second method (FIG. 3) may also be implemented with respect to the first method (FIG. 2). Similarly, any of the features described with respect to the first method may also be implemented with respect to the second method.

A remote control device 102 may wake up (e.g., change its state from a sleep operating state to an active operating state) upon receiving an input, e.g., pressing of a button on the remote control device 102. Receipt of input at the remote control device 102 may include detection of motion of the remote control device 102 (e.g., using a motion sensor in the remote control device 102), detection of a person's hand near the remote control device 102 (e.g., using a proximity sensor in the remote control device 102), etc. After waking up, the remote control device 102 may probe (transmit a probe request comprising a credential associated with the network) for IoT devices (comprising a soft AP). An IoT device comprising a soft AP may also be referred to as a remote control proxy device. In some implementations, the probe request may be for a specific SSID of a soft AP associated with an IoT device. Therefore, the method, at block 305, comprises probing for an IoT device capable of functioning as a remote control proxy device. In response to the probe request transmitted from the remote control device 102, the remote control device 102 may receive one or more probe responses from one or more IoT devices.

At block 310, the method further comprises determining an IoT device capable of functioning as a remote control proxy device. The remote control device 102 may select one of the IoT devices that transmitted a probe response to the remote control device 102 based on the proximity of the IoT device to the remote control device 102, the received signal strength indication (RSSI) associated with the probe response, the network address comprised in the probe response transmitted from the IoT device, the SSID of the IoT device, other criteria, or any combination thereof. In some implementations, the selected IoT device may be an IoT device located nearest to the remote control device 102.

At block 320, the method further comprises generating a data packet comprising a command for controlling the target device 104 and a network address associated with the target device 104. The command may be based on the input received at the remote control device 102. The data packet may additionally comprise state information, including a current known state (e.g., the 'off' state) of the target device 104 and/or an intended state (e.g., the 'on' state) of the target device 104. In some implementations, the data packet may also comprise a public action frame.

At block 330, the method further comprises transmitting the data packet to the IoT device capable of functioning as the remote control proxy device. In some implementations, upon receiving the data packet comprising the public action frame, the IoT device may transmit an acknowledgment to the remote control device 102 indicating that the IoT device received the data packet. The remote control device 120 may enter the sleep operating state after receiving the acknowledgment.

Since the data packet is transmitted to the IoT device without establishing an association (e.g., by providing a network credential) between the remote control device 102 and the IoT device, the data packet may be encrypted prior to transmitting the data packet from the remote control device 102 to the IoT device to prevent an unauthorized user (who does not have access to the credential) from copying, compromising, or otherwise deciphering the transmission. The data packet may be encrypted by the remote control device 102 using a key. The key may be established or provisioned in the remote control device 102 at the time of programming the remote control device 102. The key may be known to one or more IoT devices (e.g., the IoT device, the target device 104, etc.) on the network. The data packet transmitted from the remote control device 102 to the IoT device may also include a variable field (e.g., comprising a sequence number, a time stamp, a nonce, etc.). In some implementations, the variable field may be set prior to encrypting the data packet using the key. The presence of the variable field may make it more difficult for an unauthorized user to cause duplication of (or otherwise compromise) the data packet (e.g., the encrypted data packet) transmitted from the remote control device 102 to the IoT device.

At block 335, the method further comprises determining, using the network address comprised in the data packet, whether the IoT device, which receives the data packet, is the target device 104. Therefore, if the IoT device determines that its network address matches the network address in the data packet, the IoT device may determine that it is the target device 104 and may execute the command comprised in the data packet. Thus, at block 370, the method further comprises the target device 104 executing the command comprised in the data packet.

The execution of a command may cause a change of state from the current state of the target device 104 to the intended state of the target device 104, which may be derived from the state information comprised in the data packet. Alternatively, if the IoT device determines that it is not the target device 104 by determining that the IoT device's network address does not match the network address in the data packet, the IoT device may either unicast the data packet to the target device 104 or multicast the data packet to other IoT devices, which may also be referred to as intermediate IoT devices. Therefore, at block 340, the method further comprises unicasting, using the network address, the data packet to the target device 104. Upon receiving the data packet, the target device 104 may execute the command comprised in the data packet. At block 350, the method further comprises multicasting the data packet to other IoT devices. Each IoT device may receive the data packet and determine whether it is the target device 104 by determining whether the IoT device's network address matches the network address in the data packet. If there is a match, the IoT device may execute the command comprised in the data packet.

In some implementations, a non-transitory computer readable medium comprising code may be provided. The code may be executed by one or more processors of a device (e.g., an IoT device, a remote control device, an infrastructure device, etc.). Execution of the code may cause the device to perform any of the methods described in this disclosure.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

What is claimed is:

1. A method performed by a remote control device for controlling a target device on a network, the method comprising:
   generating a data packet comprising a command for controlling the target device, a network address associated with the target device, and a known state information of the target device;
   establishing a connection with an infrastructure device on the network; and
   transmitting the data packet to the infrastructure device, for subsequent relaying of the data packet to a plurality of IoT (Internet of Things) devices on the network, wherein an IoT device, of the plurality of the IoT devices, executes the command, by determining, using the network address and the known state information, that the IoT device is the target device.

2. The method of claim 1, wherein establishing the connection to the infrastructure device comprising transmitting, to the infrastructure device, a credential associated with the network.

3. The method of claim 1, wherein the remote control device is programmed using a configuring device.

4. The method of claim 1, wherein the network address comprises an Internet Protocol (IP) network address.

5. The method of claim 1, wherein the network address comprises a multicast media access control identification (MAC ID) address.

6. The method of claim 1, wherein the infrastructure device does not transmit an acknowledgment to the remote control device in response to receiving the data packet from the remote control device.

7. The method of claim 1, wherein the data packet comprises a first time stamp and a first sequence number, further comprising transmitting a copy of the data packet to the infrastructure device, wherein the copy comprises a second time stamp and a second sequence number.

8. The method of claim 1, wherein the data packet comprises an Internet Protocol (IP) multicast data packet.

9. The method of claim 1, wherein the data packet comprises a Universal Plug and Play (UPnP) data packet.

10. The method of claim 1, wherein the data packet is a multicast data packet, and wherein the remote control device embeds the multicast data packet inside a unicast data packet.

11. The method of claim 1, wherein the target device or the IoT device pre-subscribes with the network for receiving multicast data packets.

12. The method of claim 1, wherein executing the command comprises changing a state of the target device to an intended state, and wherein the data packet further comprises the intended state of the target device.

13. A remote control device for controlling a target device on a network, the remote control device comprising:
a communication unit; and
a processor, coupled to the communication unit, and configured to:
generate a data packet comprising a command for controlling the target device, a network address associated with the target device, and a known state information of the target device;
establishing, using the communication unit, a connection to an infrastructure device on the network; and
transmit, using the communication unit, the data packet to the infrastructure device, for subsequent relaying of the data packet to a plurality of IoT devices on the network, wherein an IoT device, of the plurality of IoT devices, executes the command, by determining, using the network address and the known state information, that the IoT device is the target device.

14. The remote control device of claim 13, wherein the communication unit comprises a Wi-Fi interface.

15. The remote control device of claim 13, wherein the processor is further configured to transmit, to the infrastructure device, a credential associated with the network.

16. The remote control device of claim 13, wherein the network address comprises an IP address or a MAC ID address, and wherein the data packet comprises an IP multicast data packet or a UPnP data packet.

17. A non-transitory computer readable medium comprising code, the code when executed by one or more processors of an infrastructure device, causes the infrastructure device to:
receive a data packet from a remote control device for controlling a target device on a network, wherein the data packet comprises a command for controlling the target device, a network address associated with the target device, and a known state information of the target device, and
multicast the data packet to a plurality of IoT devices on the network, wherein an IoT device, of the plurality of IoT devices, executes the command, by determining, using the network address and the known state information, that the IoT device is the target device.

18. The non-transitory computer readable medium of claim 17, wherein the code, when executed by the one or more processors of the infrastructure device, further causes the infrastructure device to receive the data packet on a Wi-Fi interface.

19. The non-transitory computer readable medium of claim 17, wherein the network address comprises an IP address or a MAC ID address, and wherein the data packet comprises an IP multicast data packet or a UPnP data packet.

* * * * *